Patented Aug. 22, 1939

2,170,052

UNITED STATES PATENT OFFICE 2,170,052

OXYGEN-GENERATING COMPOSITION

Moses Leib Heim and Karl Fiedler, Leipzig, Germany; said Fiedler assignor to said Heim No Drawing. Application May 27, 1938, Serial No. 210,410. In Germany July 10, 1937

4 Claims. (Cl. 23—6)

This invention relates to a product for producing oxygen baths.

It is known that the efficiency of peroxygen compounds in aqueous solutions is due to the capability of being dissociated from their alkaline metal and thus liberating active oxygen. Since the heretofore used peroxygen compounds are not readily soluble and are only partially dissociated, various catalysts have been developed to overcome the aforementioned difficulties. But these catalysts have not been found satisfactory.

It is known that in oxygen baths for bathing and cleansing purposes which baths make use of such catalytic means, it is extremely important to obtain the highest possible degree of over saturation of water with oxygen.

It is also known that the production of oxygen in such baths is effected by the addition of various catalysts, which, however, are open to objections in that they are too expensive, and must be packed separately, as the peroxygen compound when mixed with the catalyst would be destroyed or used up and lose its effect during long storage.

The present invention overcomes the disadvantages heretofore mentioned as well as others and proposes the use of sodium lignine-sulfonate as a stabilizer during dry storage and shipping periods and then functioning as a catalyst in aqueous solution during preparing of oxygen baths. We have found that for this purpose the readily soluble harmless sodium lignine sulfonate is particularly suitable and advantageous in admixture with metal per compounds, such as sodium perborate, sodium superoxide, sodium percarbonate or the like. This results in retarding the liberation or evolution of the oxygen while the aforesaid admixture is in dry state and in accelerating the liberation of oxygen when the admixture is in aqueous solution bringing about a complete evolution of said gas.

It is therefore an object of the present invention to provide a composition of matter for producing oxygen baths which provides a very efficient and economical means, which is stabilized during storage and when not in use and which develops oxygen therefrom in contact with water and simultaneously producing finer bubbles of oxygen.

It is another object of the present invention to provide a composition of matter for producing oxygen baths which includes an ingredient or ingredients capable of stabilizing said matter during storage, transportation, etc. and of producing complete oxygen evolution when placed in the bath.

It is a further object of the present invention to provide an admixture including sodium lignine sulfonate capable of working as a stabilizer or stabilizing agent when the product is in storage and which functions as a catalyst for producing a complete liberation of oxygen when placed in water.

Careful experiments have shown, that the admixture of sodium lignine sulfonate with peroxygen compounds results in an effect that might be produced by the peroxygen compounds individually. The sodium lignine sulfonate acts primarily as an aid in the evolution of oxygen from peroxygen compounds in aqueous solutions and as a stabilizer for said compounds during dry storage and shipping. Thus, sodium lignine sulfonate is a stabilizer and an alkaline catalyst which heretofore has not been known.

The unusual character of the result produced is evidenced by the fact, that if sodium lignine sulfonate is admixed with any of the metal per compounds in aqueous solution, oxygen is rapidly dissociated therefrom whereas without sodium lignine sulfonate the process would require considerable time and higher bath temperature and the per compounds would be exhausted before use thereof whilst in storage so that the oxygen effect during the preparation of the solution is reduced and in case of long storage would be entirely lost.

Some of various possible examples employing sodium lignine sulfonate may be as follows:

| | Parts by weight |
|---|---|
| Sodium lignine sulfonate | 20 |
| with | |
| Sodium perborate (mixed in dry state) | 80 |
| or | |
| Sodium per carbonate | 40 |
| Sodium perborate | 40 |
| with | |
| Sodium lignine sulfonate | 20 |
| or briefly stated: | |
| Sodium lignine sulfonate | 20 |
| and | |
| Oxygen carrier | 80 |

It will thus be seen that there has been provided a stabilizer and an alkaline catalyst which is efficient, stable and inexpensive to produce and can be applied safely and conveniently for bathing and cleansing purposes.

Having thus described our invention, what is claimed as new and desired to be secured by Letters Patent, is:

1. A new composition of matter for producing oxygen baths comprising an alkali metal per compound readily giving up oxygen upon contact with water, and sodium lignine sulfonate in amount sufficient to stabilize said per compound in dry storage and to accelerate oxygen evolution therefrom in water.

2. A composition of matter as specified in claim 1 in which the per compound is sodium perborate.

3. A composition of matter as specified in claim 1 in which the per compound is alkali metal per-oxide.

4. A composition of matter as specified in claim 1 in which the per compound is sodium per carbonate.

MOSES LEIB HEIM.
KARL FIEDLER.